United States Patent
Xu et al.

(10) Patent No.: US 10,079,531 B2
(45) Date of Patent: Sep. 18, 2018

(54) LINEAR VIBRATION MOTOR

(71) Applicants: Hongfu Xu, Shenzhen (CN); Zhilin Chai, Shenzhen (CN); Na Wu, Shenzhen (CN); Fanghua Ling, Shenzhen (CN)

(72) Inventors: Hongfu Xu, Shenzhen (CN); Zhilin Chai, Shenzhen (CN); Na Wu, Shenzhen (CN); Fanghua Ling, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 133 days.

(21) Appl. No.: 15/415,929

(22) Filed: Jan. 26, 2017

(65) Prior Publication Data

US 2018/0115231 A1 Apr. 26, 2018

(30) Foreign Application Priority Data

Oct. 25, 2016 (CN) .................... 2016 2 1160906 U

(51) Int. Cl.
  *H02K 33/00* (2006.01)
  *H02K 33/16* (2006.01)
  *B06B 1/04* (2006.01)
  *H02K 1/12* (2006.01)
  *H02K 1/34* (2006.01)
  *H02K 5/04* (2006.01)

(52) U.S. Cl.
  CPC ............. *H02K 33/16* (2013.01); *B06B 1/045* (2013.01); *H02K 1/12* (2013.01); *H02K 1/34* (2013.01); *H02K 5/04* (2013.01)

(58) Field of Classification Search
  CPC ........ H02K 33/16; H02K 33/18; H02K 33/00; H02K 5/02; H02K 1/12
  USPC .................... 310/25, 13–15, 12.01–12.33
  See application file for complete search history.

(56) References Cited

U.S. PATENT DOCUMENTS

| | | | | |
|---|---|---|---|---|
| 8,278,786 B2 * | 10/2012 | Woo | ............. | H02K 33/16 310/15 |
| 8,575,794 B2 * | 11/2013 | Lee | ............. | H02K 33/18 310/12.31 |
| 9,024,489 B2 * | 5/2015 | Akanuma | ............. | H02K 33/16 310/15 |
| 2017/0120298 A1 * | 5/2017 | Mao | ............. | B06B 1/045 |

* cited by examiner

*Primary Examiner* — Thanh Lam
(74) *Attorney, Agent, or Firm* — Na Xu; IPro, PLLC

(57) ABSTRACT

A linear vibration motor is disclosed. The linear vibration motor, includes a housing provided with an accommodation space; a vibrator accommodated in the accommodation space; and an electromagnet accommodated in the accommodation space. The vibrator includes a weight having a through-hole and a plurality of permanent magnets engaging with an inner wall of the through-hole. A number of elastic connecting parts are accommodated in the accommodation space, one end of the elastic connecting part connected with the housing and the other end connected with the weight for suspending the vibrator in the accommodation space. The electromagnet includes an iron core and a coil around the iron core for producing magnet fields interacting with the permanent magnets further for producing attracting and repelling force to drive the vibrator to vibrate.

7 Claims, 1 Drawing Sheet

LINEAR VIBRATION MOTOR

FIELD OF THE PRESENT DISCLOSURE

The present disclosure relates to the vibration motors, and more in particularly to a linear vibration motor used in portable electronic product.

DESCRIPTION OF RELATED ART

Along with the development of electronic technology, portable consumer electronics are more and more popular among people, such as mobile phone, palmtop video game player, palmtop multimedia entertainment devices and so on. These electronic products generally adopt linear vibration motor for system feedback.

At present, the linear vibration motor creates driving force by magnetic lines produced by the permanent magnet to pass through the electrified coil for driving the linear vibration motor to vibrate. However, the magnetic lines produced by the permanent magnet will be reduced in related vibrators, therefore the driving force is smaller. The size of the permanent magnet can be increased to compensate the loss of magnetic lines, however, this would increase the weight of the vibrator, and create additional load on the part supporting the vibrator.

Thereof, it is necessary to disclose and provide an improved linear vibration motor to overcome the above-mentioned disadvantages.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figures and the embodiment. It should be understood the specific embodiment described hereby is only to explain this disclosure, not intended to limit this disclosure.

Figure 1:
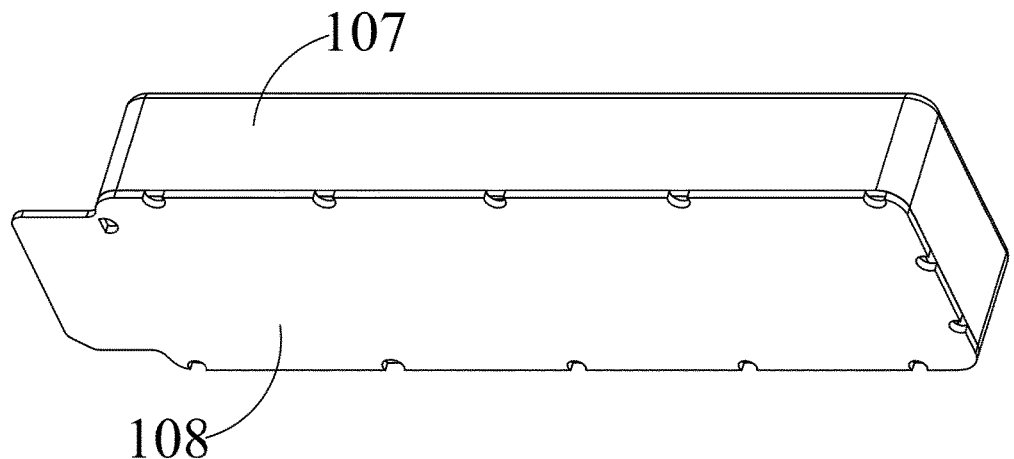
FIG. 1 is an isometric and assembled view of a linear vibration motor in accordance with an exemplary embodiment of the present disclosure.
Figure 2:
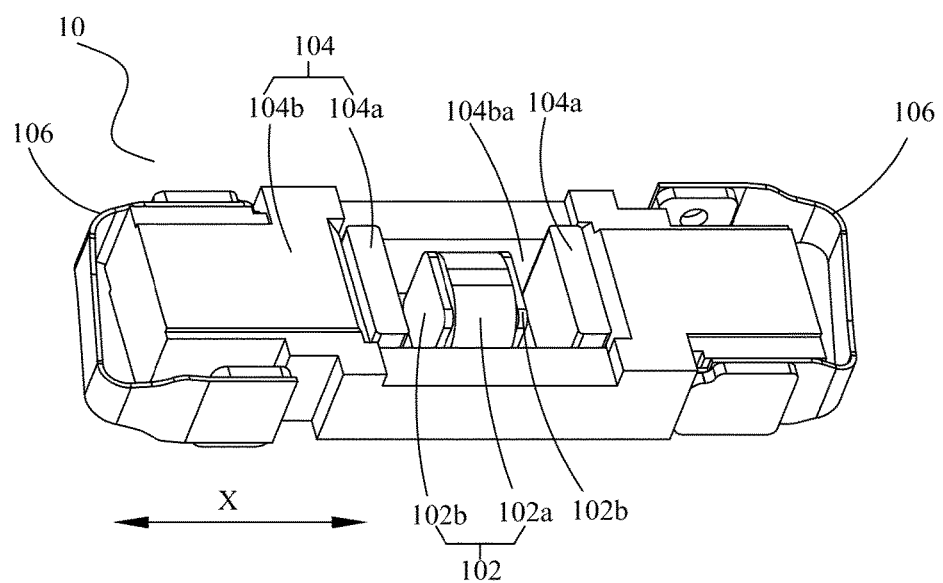
FIG. 2 is an isometric and assembled view of the linear vibration motor in FIG. 1, wherein a housing thereof has been removed.

Referring to FIGS. 1-2, a linear vibration motor 10, in accordance with an exemplary embodiment of the present disclosure, includes a housing with an accommodation space, an electromagnet 102, a vibrator 104, and a plurality of elastic connecting parts 106 respectively accommodated in the accommodation space. The housing includes a housing body 107 with a side wall and a bottom wall and includes a cover plate 108 engaging with the housing body 107 for forming the accommodation space.

The vibrator 104 includes a weight 104b provided with a through-hole 104ba and a permanent magnet 104a fixed to an inner wall of the through-hole 104ba. The electromagnet 102 is fixed on the housing and located in the through-hole 104ba and separated from the permanent magnet 104a, which effectively reduces the size of the linear vibration motor 10, and can also avoid the local offset of the vibrator 104 due to uneven force during vibration, and further improves the vibration stability of the linear vibration motor 10 accordingly.

One end of the elastic connecting part 106 is connected with the vibrator 104, more specifically, is connected firmly with the weight 104b, and the other end is fixed to the housing body 107. The elastic connecting part 106 suspends the vibrator 104, so that the vibrator 104 does not interfere with other parts during vibration.

At the same time, the elastic connecting part 106 can also provide a reacting force to buffer the vibration of the vibrator 104 and avoid the case that both ends of the vibrator 104 knock the housing body 107 in the process of vibration. In this embodiment, two elastic connecting parts 106 are installed on both ends of the vibrator 104 along a vibration direction (direction X in FIG. 2).

The electromagnet 102 includes an iron core 102b and a coil 102a wound around the iron core 102b. The coil 102a applied with AC power creates magnetic field together with the iron core 102b. The magnetic field direction changes along with the current direction, thereby creating a driving force to vibrate vibrator 104.

Optionally, ends of the coil 102a along an axis thereof are aligned with two ends of the iron core 102b, which increases the magnetic force produced by the electromagnet 102. The coil 102a can be wound directly outside the iron core 102b, or the coil 102a is wound outside a cylindrical part firstly and the iron core 102b is inserted into the cavity of the cylindrical part then.

After the coil 102a is applied with electric power, the iron core 102b is magnetized and becomes a magnet. The magnetic field of the magnet interacts with the magnetic field of the electromagnet 102, which greatly increases the magnetic force of the coil 102a, and the electromagnet 102 produces a greater magnetic force. The vibrator 104 includes a permanent magnet 104a. The magnetic pole of the permanent magnet 104a is set opposite to the end of the iron core 102b of the electromagnet 102. The permanent magnet 104a is located within the range of the magnetic field generated by the electromagnet 102. After the coil 102a is applied with electric power, the permanent magnet 104a is attracted and repelled by the electromagnet 102 and moves back and forth, thereby the vibrator 104 vibrates with an improved vibration effect.

It is important to be noted that the power applied to the coil 102a is AC power, so the polarity on both ends of the iron core 102b of the electric magnet 102 changes constantly to attract and repel the vibrator 104. The vibrate 104 can vibrate linearly. In addition, when the vibrator 104 vibrates linearly, the electromagnet 102 is stationary.

Further, the permanent magnet 104a can be fixed on the inner wall of the through hole 104a of the weight 104b by soldering or adhesive bonding, to improve the connection strength between the permanent magnet 104a and the weight 104b, and to improve the application stability of the vibrator 104.

In this embodiment, two permanent magnets 104a include a first permanent magnet and a second permanent magnet. The first permanent magnet and the second permanent magnet are fixed respectively on a first inner wall and a second inner wall of the through-hole 104ba. A magnetic pole of the permanent magnet is set opposite to a first end of the iron core 102b and a magnetic pole of the second permanent magnet is set opposite to a second end of the iron core 102b.

The first permanent magnet and the second permanent magnet are such arranged that the magnetic pole of the first permanent magnet facing the first end of the iron core 102b is the same to the magnetic pole of the second permanent magnet facing the second end of the iron core 102b. When the electromagnet 102 is applied with electric power, the first end and the second end of the iron core 102b have different polarity. When the first end of the iron core 102b and the first permanent magnet repel each other, the second end of the iron core 102b and the second permanent magnet attract each other.

When the first end of the iron core 102b and the first permanent magnet attract each other, the second end of the iron core 102b and the second permanent magnet repel each other. This design can improve the driving force of the electromagnet 102 to drive the vibrator 104 to vibrate, and greatly improve the vibration effect of the vibrator 104. Moreover, as the first permanent magnet and the second permanent magnet are installed symmetrically on both ends of the iron core 102b, an enough driving force is created on both sides of the electromagnet 102, so the vibrator 104 is more stable in the process of vibration.

Optionally, the first inner wall of the through-hole 104ba can be equipped with a first mounting groove to position the first permanent magnet. The second inner wall of the through-hole 104ba is equipped with a second mounting groove to position the second permanent magnet. The first permanent magnet and the second permanent magnet can be installed quickly in this way, and the connection strength between the permanent magnet and the second permanent magnet with the weight 104b can be increased also.

After the first permanent magnet and the second permanent magnet are respectively installed in the first mounting groove and the second mounting groove, the first permanent magnet and the second permanent magnet can be fixed on the weight 104b by soldering or adhesive bonding, improving the application stability of the vibrator 104.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A linear vibration motor, comprising:
a housing provided with an accommodation space;
a vibrator accommodated in the accommodation space, the vibrator including a weight having a through-hole and a plurality of permanent magnets engaging with an inner wall of the through-hole;
an electromagnet accommodated in the accommodation space, the electromagnet being located in the through-hole and separated from the permanent magnets;
a plurality of elastic connecting parts accommodated in the accommodation space, one end of the elastic connecting part connected with the housing and the other end connected with the weight for suspending the vibrator in the accommodation space; wherein
the electromagnet includes an iron core and a coil around the iron core for producing magnet fields interacting with the permanent magnets further for producing attracting and repelling force to drive the vibrator to vibrate.

2. The linear vibration motor as described in claim 1, wherein the through-hole is provided with a first inner wall for fixing a first permanent magnet and a second inner wall for fixing a first permanent magnet, correspondingly, the iron core has a first end opposite to a magnetic pole of the first permanent magnet and a second end opposite to a magnetic pole of the second permanent magnet, the polarity of the magnetic pole of the first permanent magnet facing the first end of the iron core is the same to the polarity of the magnetic pole of the second permanent magnet facing the second end of the iron core.

3. The linear vibration motor as described in claim 2, wherein the first inner wall is provided with a first mounting groove for fixing the first permanent magnet.

4. The linear vibration motor as described in claim 3, wherein the second inner wall is provided with a second mounting groove for fixing the second permanent magnet.

5. The linear vibration motor as described in claim 1, wherein the permanent magnet is fixed on the inner wall of the through hole by soldering or adhesive bonding.

6. The linear vibration motor as described in claim 1, wherein two ends of the coil along an axis thereof are aligned with two ends of the iron core.

7. The linear vibration motor as described in claim 1, wherein the housing includes a housing body having a side wall and a bottom wall, and a cover plate engaging with the housing body for forming the accommodation space, one end of the elastic connecting part is connected with the housing body and the other end is connected with the weight.

* * * * *